(12) United States Patent
Ichikawa (10) Patent No.: US 9,531,216 B2
(45) Date of Patent: Dec. 27, 2016

(54) POWER TRANSMISSION SYSTEM AND POWER RECEIVING APPARATUS

(71) Applicant: MURATA MANUFACTURING CO., LTD., Nagaokakyo-Shi, Kyoto-fu (JP)

(72) Inventor: Keiichi Ichikawa, Nagaokakyo (JP)

(73) Assignee: MURATA MANUFACTURING CO., LTD., Nagaokakyo-shi, Kyoto-Fu (JP)

( * ) Notice: Subject to any disclaimer, the term of this patent is extended or adjusted under 35 U.S.C. 154(b) by 654 days.

(21) Appl. No.: 14/017,698

(22) Filed: Sep. 4, 2013

(65) Prior Publication Data

US 2014/0009002 A1   Jan. 9, 2014

Related U.S. Application Data

(63) Continuation of application No. PCT/JP2012/062902, filed on May 21, 2012.

(30) Foreign Application Priority Data

Jun. 13, 2011   (JP) ................. 2011-131094

(51) Int. Cl.
*H02J 17/00*   (2006.01)
*H04B 5/00*   (2006.01)
(Continued)

(52) U.S. Cl.
CPC ............... *H02J 17/00* (2013.01); *H02J 5/005* (2013.01); *H02J 7/025* (2013.01); *H02J 50/05* (2016.02); *H04B 5/0012* (2013.01); *H04B 5/0037* (2013.01)

(58) Field of Classification Search
CPC .............. H01F 38/14; H02J 5/00; H02J 5/005; H02J 7/025; H02J 17/00; H02J 50/00; H02J 50/05; H02J 50/10; H02J 50/12; H04B 5/00; H04B 5/0012; H04B 5/0037; H04B 5/0075
(Continued)

(56) References Cited

U.S. PATENT DOCUMENTS 5,923,544 A *   7/1999   Urano ..................... H02J 7/025
                                                              307/104
8,242,638 B2   8/2012   Camurati et al.
(Continued)

FOREIGN PATENT DOCUMENTS

JP   H05-038232 A    2/1993
JP   9-312942 A    12/1997
(Continued)

OTHER PUBLICATIONS

International Search Report with Written Opinion for PCT/JP2012/062902; date of mailing Aug. 14, 2012.
(Continued)

*Primary Examiner* — Levi Gannon
(74) *Attorney, Agent, or Firm* — Arent Fox LLP (57) ABSTRACT

A piezoelectric transformer includes capacitance elements, an inductance element, a resistance, and an ideal transformer. A first resonance circuit includes the piezoelectric transformer, the capacitance of a capacitance element of a coupling electrode of a power receiving apparatus, and the capacitance of a capacitance element of a coupling electrode of a power transmitting apparatus. On the other hand, a second resonance circuit includes an equivalent output capacitance of the piezoelectric transformer and an inductance element. The frequency of a high-frequency high voltage that is generated by a high-frequency high-voltage generating circuit is set to a value between two resonance frequencies generated by a complex resonance of the first resonance circuit and the second resonance circuit.

20 Claims, 6 Drawing Sheets

(51) Int. Cl.
    *H02J 5/00*    (2016.01)
    *H02J 7/02*    (2016.01)
(58) Field of Classification Search
    USPC .................................................. 307/104, 109
    See application file for complete search history.

(56)         References Cited

U.S. PATENT DOCUMENTS

| | | | |
|---|---|---|---|
| 8,552,596 B2* | 10/2013 | Ichikawa | ................ H02J 5/005 |
| | | | 307/104 |
| 2009/0302690 A1 | 12/2009 | Kubono et al. | |
| 2010/0115474 A1 | 5/2010 | Takada et al. | |
| 2011/0234019 A1 | 9/2011 | Camurati et al. | |
| 2012/0286583 A1* | 11/2012 | Ichikawa | .............. H01L 41/107 |
| | | | 307/104 |
| 2014/0285029 A1* | 9/2014 | Ichikawa | ................. B60L 7/14 |
| | | | 307/104 |

FOREIGN PATENT DOCUMENTS

| | | |
|---|---|---|
| JP | 2002-111090 A | 4/2002 |
| JP | 2009-531009 A | 8/2009 |
| JP | 2009-296857 A | 12/2009 |
| JP | 2010-537613 A | 12/2010 |

OTHER PUBLICATIONS

Yamashita, Tomofumi, "Novel Power-Saving Type Inverter with Piezo-Electric Transformer for Back Light of Liquid Crystal Panel", Ricoh Technical Report, Dec. 2012, No. 312, pp. 59-66. Published in Japan. (English abstract attached).

* cited by examiner

POWER TRANSMISSION SYSTEM AND POWER RECEIVING APPARATUS

CROSS REFERENCE TO RELATED APPLICATIONS

The present application is a continuation of PCT/JP2012/062902 filed May 21, 2012, which claims priority to Japanese Patent Application No. 2011-131094, filed Jun. 13, 2011, the entire contents of each of which are incorporated herein by reference.

FIELD OF THE INVENTION

The present invention relates to a power transmission system employing an electric field coupling method in which power is wirelessly transmitted and a power receiving apparatus.

BACKGROUND OF THE INVENTION

As a representative example of a wireless power transmission system, there is known a power transmission system employing a magnetic field coupling method in which power is transmitted from a primary coil of a power transmitting apparatus to a secondary coil of a power receiving apparatus using a magnetic field. However, in the case where power is transmitted by magnetic field coupling, the magnitude of magnetic flux that passes through each of the coils significantly affects the electromotive force, and thus, high precision is required for the relative positional relationship between the primary coil and the secondary coil. Since coils are used, it is difficult to reduce the sizes of the apparatuses.

On the other hand, there is also known a wireless power transmission system employing an electric field coupling method such as that disclosed in Patent Document 1. In this system, power is transmitted from a coupling electrode of a power transmitting apparatus to a coupling electrode of a power receiving apparatus through an electric field. In the method, the degree of precision required for the relative positional relationship between the coupling electrodes is relatively low, and the coupling electrodes can be reduced in size and thickness.

Figure 1:
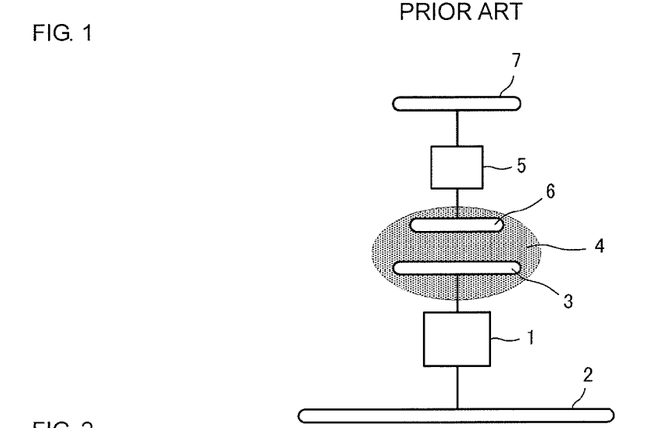
FIG. 1 is a diagram illustrating the basic configuration of a power transmission system according to Patent Document 1.

FIG. 1 is a diagram illustrating the basic configuration of a power transmission system according to Patent Document 1. The power transmission system includes a power transmitting apparatus and a power receiving apparatus. The power transmitting apparatus includes a high-frequency high-voltage generating circuit 1, a passive electrode 2, and an active electrode 3. The power receiving apparatus includes a high-frequency high-voltage load circuit 5, a passive electrode 7, and an active electrode 6. The active electrode 3 of the power transmitting apparatus and the active electrode 6 of the power receiving apparatus come close to each other across a high-voltage electric field region 4, so that the two electrodes are brought into an electric field coupling relationship.

As described above, in wireless power transmission employing an electric field coupling method, an active electrode and a passive electrode are arranged in both a power transmitting apparatus and a power receiving apparatus, and the active electrode and the passive electrode in the power transmitting apparatus need to be respectively coupled with the active electrode and the passive electrode in the power receiving apparatus. The amount of power to be transmitted and transmission efficiency depend on the coupling strengths between the electrodes. In order to strengthen the couplings between the electrodes, reducing the distances between the electrodes and increasing the areas of the electrodes can be considered.

Patent Document 1: Japanese Unexamined Patent Application Publication (Translation of PCT Application) No. 2009-531009

In general, as a method of improving transmission efficiency of a power transmission system, it is effective to incorporate a low-loss resonance circuit in a power transmission system. The resonance circuit includes an electrostatic capacitance and an inductor in a coupling portion in which a power transmitting apparatus and a power receiving apparatus are coupled to each other. In general, the Q value of an inductor is lower than the Q value of a capacitance, and thus, in the case where an electrostatic capacitance and an inductor are combined with each other as a resonance circuit, the Q value of the resonance circuit is limited by the Q value of the inductor. One problem is how to realize a small-sized and low-loss inductor. As a measure to solve the problem, it is effective to use a piezoelectric device (a piezoelectric resonator or a piezoelectric transformer) as an inductor. However, although a piezoelectric device is small-sized and low-loss, there have been problems in that a piezoelectric device has sharp frequency characteristics, and that an output voltage (the ratio V2/V1 of a voltage V2 of a power receiving apparatus to a voltage V1 of a power transmitting apparatus) significantly varies in the case of load variations.

In addition, also in the case where a piezoelectric device is not used, there has been a problem in that the output voltage varies in response to load variations and drive frequency variations.

SUMMARY OF THE INVENTION

Therefore, an object of the present invention is to provide a power transmission system and a power receiving apparatus in which the ratio V2/V1 of a voltage V2 of a power receiving apparatus to a voltage V1 of a power transmitting apparatus is stabilized in the case where load variations in the power receiving apparatus or drive frequency variations occur.

The present invention provides a power transmission system that includes a power transmitting apparatus including a power-transmitting-apparatus coupling electrode, which includes an active electrode and a passive electrode, and a high-frequency high-voltage generating circuit that applies a high-frequency high voltage to the power-transmitting-apparatus coupling electrode and a power receiving apparatus including a power-receiving-apparatus coupling electrode, which is coupled to the power-transmitting-apparatus coupling electrode and which includes an active electrode and a passive electrode, and a power receiving circuit that is connected to the power-receiving-apparatus coupling electrode. Power is transmitted from the power transmitting apparatus to the power receiving apparatus by bringing the power-transmitting-apparatus coupling electrode and the power-receiving-apparatus coupling electrode into an electric field coupling relationship.

The power receiving circuit includes a first resonance circuit that is connected in series between the active electrode and the passive electrode of the power-receiving-apparatus coupling electrode and that includes an inductance component and a capacitance component, a second resonance circuit that includes the capacitance component and an inductance component connected in parallel to the capacitance component, and a load circuit that is connected in parallel to the second resonance circuit. A frequency of a high-frequency high voltage that is generated by the high-frequency high-voltage generating circuit is set to a value between two resonance frequencies generated by a complex resonance of the first resonance circuit and the second resonance circuit.

It is preferable that the power transmitting apparatus includes a voltage detection circuit that detects a voltage generated by the high-frequency high-voltage generating circuit and a voltage stabilizing circuit that controls the voltage generated by the high-frequency high-voltage generating circuit such that a voltage detected by the voltage detection circuit becomes constant.

It is preferable that the power receiving circuit includes a piezoelectric transformer including an input terminal that is connected to the active electrode of the power-receiving-apparatus coupling electrode, an output terminal that is connected to the passive electrode of the power-receiving-apparatus coupling electrode, and a reference potential terminal. The piezoelectric transformer steps down a voltage applied to the input terminal and outputs the voltage to the output terminal. It is preferable that the capacitance component be an equivalent output capacitance of the piezoelectric transformer.

It is preferable that the first resonance circuit includes capacitance components that are generated at the power-transmitting-apparatus coupling electrode and the power-receiving-apparatus coupling electrode.

It is preferable that the high-frequency high-voltage generating circuit includes a third resonance circuit that resonates with the high-frequency high voltage applied to the power-transmitting-apparatus coupling electrode.

The present invention provides a power receiving apparatus that is paired with a power transmitting apparatus including a power-transmitting-apparatus coupling electrode, which includes an active electrode and a passive electrode, and a high-frequency high-voltage generating circuit that applies a high-frequency high voltage to the power-transmitting-apparatus coupling electrode and that includes a power-receiving-apparatus coupling electrode, which is coupled to the power-transmitting-apparatus coupling electrode and which includes an active electrode and a passive electrode, and a power receiving circuit that is connected to the power-receiving-apparatus coupling electrode. The power receiving circuit includes a first resonance circuit that is connected in series between the active electrode and the passive electrode of the power-receiving-apparatus coupling electrode and that includes an inductance component and a capacitance component, a second resonance circuit that includes the capacitance component and an inductance component connected in parallel to the capacitance component, and a load circuit that is connected in parallel to the second resonance circuit. A frequency of a high-frequency high voltage that is generated by the high-frequency high-voltage generating circuit is set to a value between two resonance frequencies generated by a complex resonance of the first resonance circuit and the second resonance circuit.

Since a composite resonance system in which a first resonance circuit and a second resonance circuit are coupled to each other is formed, the matching of a power transmitting apparatus and a power receiving apparatus is improved, occurrence of standing waves in the first resonance circuit is reduced, and electrical oscillation energy is smoothly transmitted to a load. As a result, the ratio V2/V1 of a voltage V2 of a power receiving apparatus to a voltage V1 of a power transmitting apparatus can be stabilized in the case of load variations.

DETAILED DESCRIPTION OF THE PREFERRED EMBODIMENTS OF THE INVENTION

First Embodiment

Figure 2:
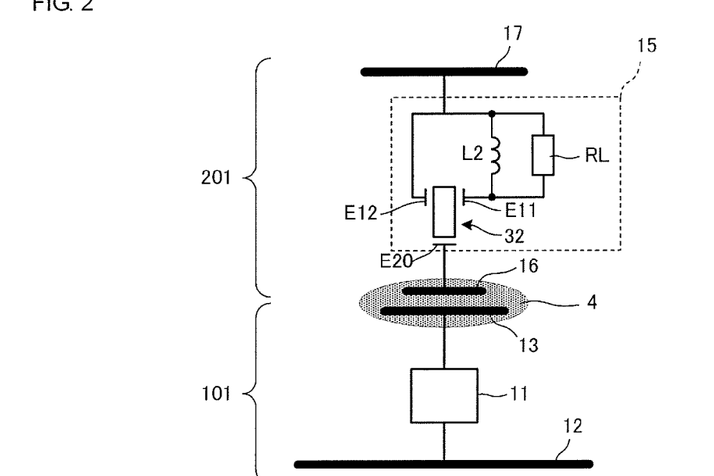
FIG. 2 is a schematic diagram of a power transmission system according to a first embodiment.

FIG. 2 is a schematic diagram of a power transmission system according to a first embodiment. FIG. 2 illustrates a power transmitting apparatus 101 and a power receiving apparatus 201 that is mounted on the power transmitting apparatus 101. In the power transmitting apparatus 101, a power-transmitting-apparatus coupling electrode that includes an active electrode 13 and a passive electrode 12 of the power transmitting apparatus is provided. In the power receiving apparatus 201, a power-receiving-apparatus coupling electrode that includes an active electrode 16 and a passive electrode 17 of the power receiving apparatus is provided.

A power receiving circuit 15 is provided in the power receiving apparatus 201. The power receiving circuit 15 includes a piezoelectric transformer 32, an inductance element L2, and a load circuit RL. A reference potential terminal E12 of the piezoelectric transformer 32 is connected to the passive electrode 17 of the power receiving apparatus, and the inductance element L2 and the load circuit RL are connected between the passive electrode 17 and an output terminal E11. As will be described in detail later, a voltage that is stepped down by the piezoelectric transformer 32 is supplied to the load circuit RL. The load circuit RL includes a rectifying-and-smoothing circuit and a load operated by a direct-current voltage that is output from the rectifying-and-smoothing circuit.

Power is transmitted from the power transmitting apparatus 101 to the power receiving apparatus 201 via a high-voltage electric field region 4 while the power receiving apparatus 201 is mounted on the power transmitting apparatus 101 as described above.

Energy transmission over short distances using electric field coupling (a quasi-static electric field) is the basic principle of the power transmission system according to the present invention. When a wavelength λ is sufficiently long compared to the size and an operating range (a distance d) of an electric field oscillation source, that is, in the case of a relationship of d/λ<<1, the quasi-static electric field remains (is bounded) in the vicinity of the electric field oscillation source, the amount of radiation radiated to a distant point is vanishingly small. In other words, only a small amount of energy is emitted as electromagnetic waves.

Note that, whereas electromagnetic waves are transverse mode waves (that is, both an electric field and a magnetic field are perpendicular to the propagation direction of the waves), energy is transmitted in the same direction as an electric field in power transmission using a quasi-static electric field as in the present invention. In other words, in the case where a low-frequency voltage is used in energy transmission using a quasi-static electric field, a formula "Z=V/I" (where Z is impedance, V is voltage, and I is current) holds true.

The load includes, for example, a secondary battery for a power supply of the power receiving apparatus 201, and the secondary battery in the power receiving apparatus 201 is charged by mounting the power receiving apparatus 201 onto the power transmitting apparatus 101.

Figure 3:
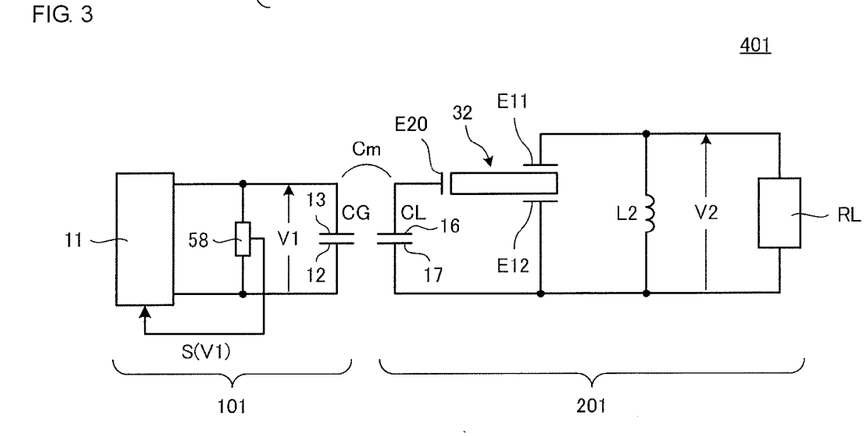
FIG. 3 is a circuit diagram of the power transmission system 401 according to the first embodiment.

FIG. 3 is a circuit diagram of the power transmission system 401 according to the first embodiment. A high-frequency high-voltage generating circuit 11 of the power transmitting apparatus 101 generates a high-frequency voltage in the range of, for example, 100 kHz to several tens of MHz. The voltage generated by the high-frequency high-voltage generating circuit 11 is applied between the passive electrode 12 and the active electrode 13. A capacitance element CG mainly includes the capacitance generated between the passive electrode 12 and the active electrode 13.

A voltage step-down circuit that includes the piezoelectric transformer 32 and the inductance element L2 is connected between the passive electrode 17 and the active electrode 16 of the power receiving apparatus 201. A capacitance element CL mainly includes the capacitance generated between the passive electrode 17 and the active electrode 16.

The piezoelectric transformer 32 steps down a voltage that is applied between the reference potential terminal E12 and an input terminal E20 and outputs the voltage to the output terminal E11.

The coupling electrode that includes the passive electrode and the active electrode of the power transmitting apparatus 101 and the coupling electrode that includes the passive electrode and the active electrode of the power receiving apparatus 201 are coupled to each other via a mutual capacitance Cm.

For example, the high-frequency high-voltage generating circuit 11 generates a high-frequency high voltage in the range of 100 to 3 kV, and the piezoelectric transformer 32 steps down a voltage that is induced by the capacitance element CL from the range of 100 to 3 kV to the range of 5 to 12 V and outputs the voltage to the load circuit RL.

Note that the output terminal E11 of the piezoelectric transformer 32 may be connected to the passive electrode 17 of the power receiving apparatus 201, and the inductance element L2 and the load circuit RL may be connected between the passive electrode 17 and the reference potential terminal E12. In other words, the reference potential terminal E12 and the output terminal E11 may be exchanged with each other.

Figure 4:
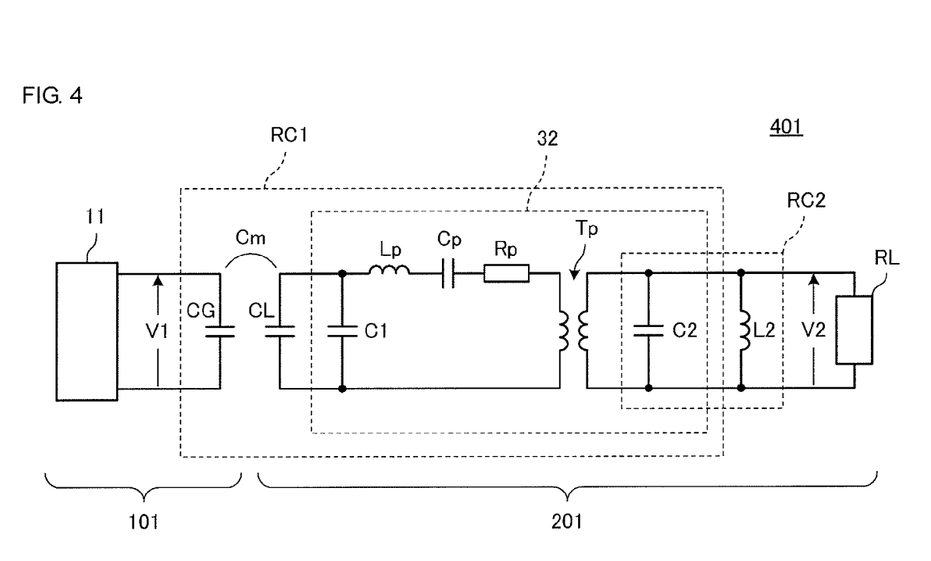
FIG. 4 is an equivalent circuit diagram of the power transmission system 401 according to the first embodiment.

FIG. 4 is an equivalent circuit diagram of the power transmission system 401 according to the first embodiment. As illustrated in FIG. 4, the piezoelectric transformer 32 includes capacitance elements C1 and C2, an inductance element Lp, a capacitance element Cp, a resistance Rp, and an ideal transformer Tp.

The capacitance element C2 is an equivalent output capacitance of the piezoelectric transformer, and the capacitance element Cp and the inductance element Lp are electromechanical parameters. The resonance frequency of the piezoelectric transformer 32 is determined mainly by the resonance of a resonance circuit that includes the capacitance element Cp and the inductance element Lp. A piezoelectric ceramic that elastically vibrates is used in electric energy conversion, and the piezoelectric ceramic has the natural resonance frequency that is determined by the elastic wave propagation velocity and the dimensions of the piezoelectric ceramic. A first resonance circuit RC1 includes the piezoelectric transformer 32, the capacitance of the capacitance element CL of the coupling electrode of the power receiving apparatus 201, and the capacitance element CG of the coupling electrode of the power transmitting apparatus 101. The resonance frequency of the first resonance circuit RC1 is determined by a circuit constant of the first resonance circuit RC1.

In the case where the power transmitting apparatus and the power receiving apparatus are strongly coupled to each other, improvement of power transmission can be achieved. However, in the case of increasing the mutual capacitance Cm in order to realize the improvement, the influence of the capacitance of the other apparatus (i.e., the power transmitting apparatus) cannot be ignored. Therefore, in this case, it is preferable to include the capacitance component CG and CL generated at the power-transmitting-apparatus coupling electrode and the power-receiving-apparatus coupling electrode in a capacitance component of the first resonance circuit RC1 when the first resonance circuit RC1 is designed.

On the other hand, a second resonance circuit RC2 includes the capacitance element (the capacitance component) C2, which is an equivalent output capacitance of the piezoelectric transformer 32, and the inductance element L2, and the resonance frequency of the second resonance circuit RC2 is determined by the capacitance of the capacitance element C2 and the inductance of the inductance element L2.

The frequency of a high-frequency high voltage that is generated by the high-frequency high-voltage generating circuit 11 is set to a value between two resonance frequencies generated by a complex resonance (a combination resonance) of the first resonance circuit RC1 and the second resonance circuit RC2.

Since the piezoelectric transformer 32 is a capacitive device, the inductance element L2 also serves as an impedance matching circuit between the load circuit RL and the piezoelectric transformer 32. Therefore, occurrence of standing waves in the first resonance circuit RC1 is reduced, undesirable energy is not stored in the piezoelectric transformer 32, and energy is smoothly transmitted to the load circuit RL. Consequently, the piezoelectric transformer 32 is prevented from overheating.

The power transmitting apparatus can be reduced in size, and occurrence of a leakage magnetic field can be suppressed by using the piezoelectric transformer that is a capacitive device in a voltage step-down circuit as compared with the case where a wire-wound transformer is used.

Figure 5:
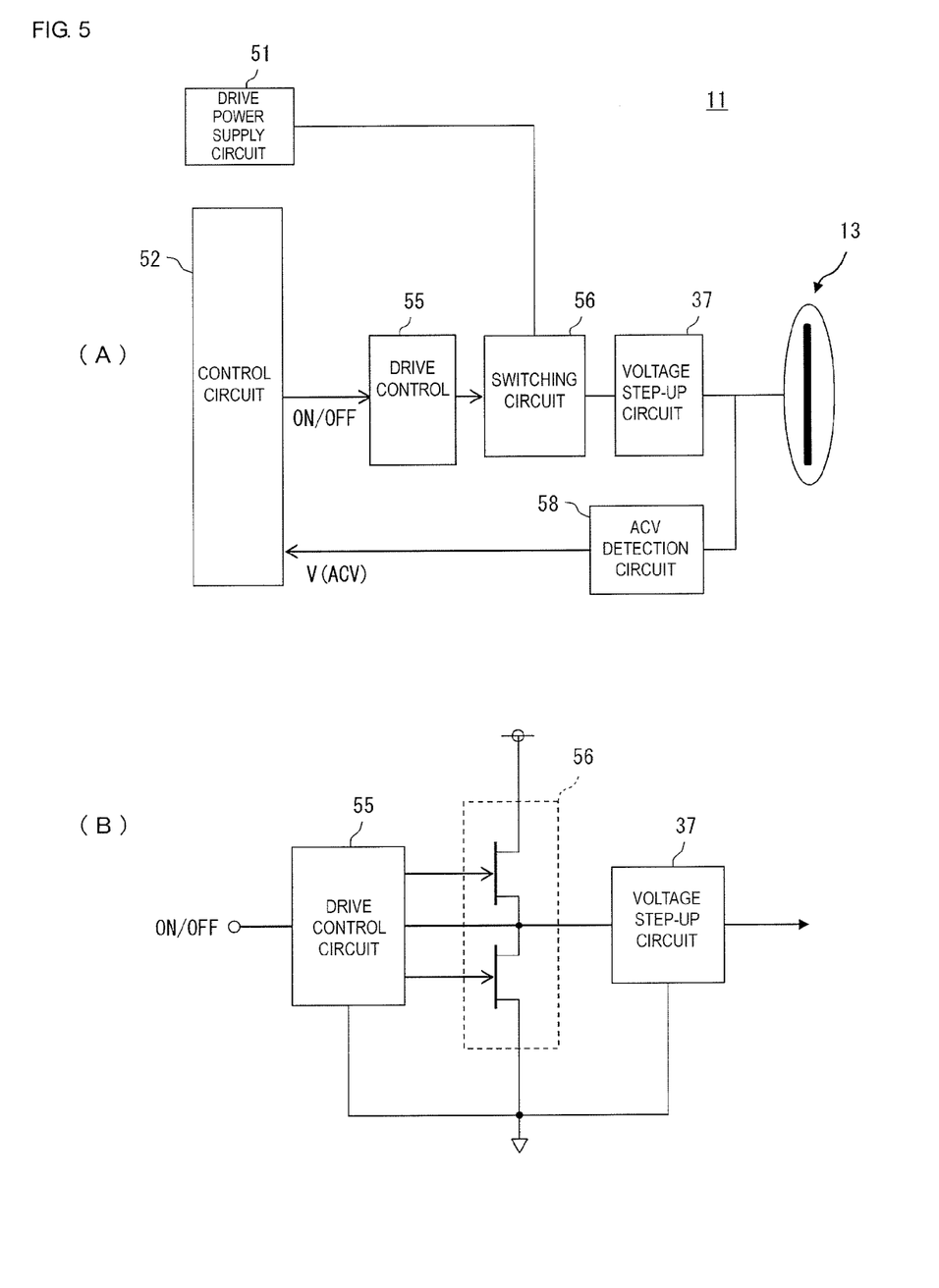
FIG. 5(A) is a block schematic diagram of a high-frequency high-voltage generating circuit of a power transmitting apparatus 101.
FIG. 5(B) is a diagram illustrating the relationship between the configuration of a switching circuit 56 and a drive control circuit 55.

FIG. 5(A) is a block schematic diagram of the high-frequency high-voltage generating circuit of the power transmitting apparatus 101. Here, a drive power supply circuit 51 is a power supply circuit that generates a constant direct-current voltage (e.g., DC 5 V) by use of a commercial power supply. A control circuit 52 controls units that will be described below by inputting and outputting signals to and from each of the units.

A drive control circuit 55 switches a switching element of a switching circuit 56 on and off in accordance with an on/off signal that is output from the control circuit 52. The switching circuit 56 alternately drives an input of a voltage step-up circuit 37 as will be described later.

An ACV detection circuit 58 divides, on the basis of capacitance, an applied voltage that is applied to the active electrode 13 while the passive electrode 12 functions as a reference and generates a direct-current voltage that is obtained by rectifying the divided alternating voltage as a detection signal V (ACV). The ACV detection circuit 58 corresponds to "a voltage detection circuit" according to the present invention. The control circuit 52 reads the detection signal V (ACV) and performs feedback control on a voltage generated by the high-frequency high-voltage generating circuit such that the detection signal V (ACV) becomes constant. The control circuit 52 that performs feedback control corresponds to "a voltage stabilizing circuit" according to the present invention.

FIG. 5(B) is a diagram illustrating the relationship between the configuration of the switching circuit 56 and the drive control circuit 55. The switching circuit 56 performs a push-pull operation by turning on and off a switch element on the high side and a switch element on the low side and alternately drives the voltage step-up circuit 37.

Figure 6:
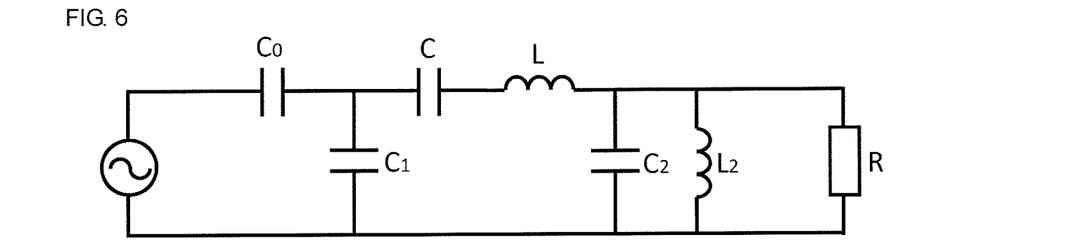
FIG. 6 is another equivalent circuit diagram of the power transmission system 401 according to the first embodiment.

FIG. 6 is another equivalent circuit diagram of the power transmission system 401 according to the first embodiment. The equivalent circuit is an equivalent circuit in which the first resonance circuit and the second resonance circuit are combined with each other. Here, a capacitor $C_0$ corresponds to capacitance components generated at the coupling electrodes of the power transmitting apparatus and the power receiving apparatus, a capacitor C corresponds to the capacitor Cp illustrated in FIG. 4, and an inductor L corresponds to the inductor Lp illustrated in FIG. 4.

Figure 7:
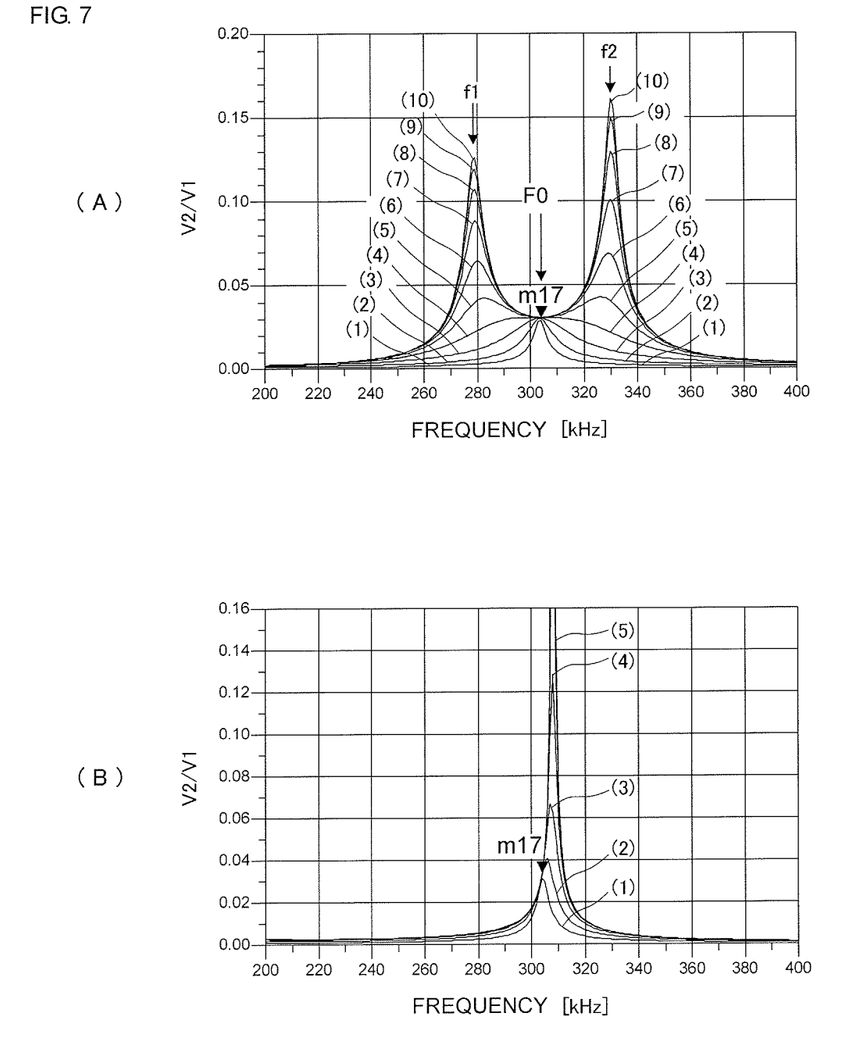
FIG. 7(A) is a diagram illustrating the frequency dependence of the ratio (the voltage conversion ratio) of a voltage V2 that is applied to a coupling electrode of a power receiving apparatus 201 to a voltage V1 that is applied to a coupling electrode of the power transmitting apparatus 101 of the power transmission system according to the first embodiment.
FIG. 7(B) is a diagram illustrating an example of the frequency dependence of the voltage conversion ratio of a comparative power transmission system.

FIG. 7(A) is a diagram illustrating the frequency dependence of the ratio (the voltage conversion ratio) of a voltage V2 that is applied to a coupling electrode of the power receiving apparatus 201 to a voltage V1 that is applied to the coupling electrode of the power transmitting apparatus 101 of the power transmission system according to the first embodiment. In FIG. 7(A), the load is varied while the degree of coupling of the coupling electrode that includes the passive electrode and the active electrode of the power transmitting apparatus 101 and the coupling electrode that includes the passive electrode and the active electrode of the power receiving apparatus 201 is constant.

In FIG. 7(A), the angular frequency ω0 of a resonance frequency f0, (=2πf0) can be expressed by the following formula.

[Math. 1]

$$\omega_0^2 = \left(1 + \frac{C}{C_1 + C_0}\right)\frac{1}{LC} \quad (1)$$

In addition, the angular frequency ω1 of a resonance frequency f1 (=2πf1) can be expressed by the following formula.

[Math. 2]

$$\omega_1^2 = \frac{1}{2}\left(\frac{1}{L_2C_2} + \frac{1}{LC_2} + \left(1 + \frac{C}{C_1 + C_0}\right)\frac{1}{LC}\right) - \sqrt{\frac{1}{4}\left(\frac{1}{L_2C_2} + \frac{1}{LC_2} + \left(1 + \frac{C}{C_1 + C_0}\right)\frac{1}{LC}\right)^2 - \left(1 + \frac{C}{C_1 + C_0}\right)\frac{1}{(LC)(L_2C_2)}} \quad (2)$$

Furthermore, the angular frequency ω2 of a resonance frequency f2 (=2πf2) can be expressed by the following formula.

[Math. 3]

$$\omega_2^2 = \frac{1}{2}\left(\frac{1}{L_2C_2} + \frac{1}{LC_2} + \left(1 + \frac{C}{C_1 + C_0}\right)\frac{1}{LC}\right) + \sqrt{\frac{1}{4}\left(\frac{1}{L_2C_2} + \frac{1}{LC_2} + \left(1 + \frac{C}{C_1 + C_0}\right)\frac{1}{LC}\right)^2 + \left(1 + \frac{C}{C_1 + C_0}\right)\frac{1}{(LC)(L_2C_2)}} \quad (3)$$

FIG. 7(B) is a diagram illustrating an example of the frequency dependence of the voltage conversion ratio of a comparative power transmission system. A power receiving apparatus of the comparative power transmission system does not include the inductance element L2 illustrated in FIGS. 3 and 4. Therefore, the second resonance circuit (the RC2 in FIG. 4) is not present in the power receiving apparatus of the comparative power transmission system.

In FIGS. 7(A) and 7(B), characteristic curves (1) to (10) represent frequency dependence characteristics at respective resistance values in the case where the resistance value of the load R is varied in the range of 10Ω to 10 kΩ. As the number in parentheses becomes larger, the load resistance value becomes larger. In FIG. 7(B), peaks of the characteristic curves of (5) and higher that represent the voltage conversion ratio V2/V1 in the case of a high resistance load are significantly out of the range illustrated in FIG. 7(B).

As is evident from FIG. 7(B), in the case of using a power receiving apparatus that does not include the second resonance circuit, the voltage conversion ratio V2/V1 increases as the load resistance increases, and the voltage conversion ratio V2/V1 becomes excessively large when there is no load. A marker m17 in FIG. 7(B) is the voltage conversion ratio V2/V1 at a rated load, and the frequency (about 305 kHz) at which the voltage conversion ratio V2/V1 can be secured at the rated load and the frequency (about 309 kHz) at which the voltage conversion ratio V2/V1 becomes excessively large are very close to each other. Thus, the voltage conversion ratio V2/V1 varies in accordance with frequency variations associated with load variations, and as a result, the voltage V2 of the power receiving apparatus significantly varies. Therefore, precise and responsive control over the load variations is required.

In contrast, according to the first embodiment of the present invention, the frequencies at which the voltage conversion ratio V2/V1 becomes excessively large are 280 kHz and 330 kHz as illustrated in FIG. 7(A), and both the frequencies are significantly separated from a drive frequency (about 305 kHz). Thus, the voltage conversion ratio V2/V1 is maintained substantially constant even if the drive frequency varies in accordance with load variations or the like.

It is preferable that the drive frequency be the frequency f0 at which the voltage conversion ratio V2/V1 becomes maximum or minimum when the load is varied while the degree of coupling of the coupling electrode of the power transmitting apparatus and the coupling electrode of the power receiving apparatus is constant. The equivalent circuit constant in FIG. 6 is set such that a frequency at which the voltage conversion ratio V2/V1 becomes minimum when the resistance value of the load R is brought close to 10 kΩ from the low resistance value and a frequency at which the voltage conversion ratio V2/V1 becomes maximum when the resistance value of the load R is brought close to 10Ω from the high resistance value are the same frequency, and f0 is spaced away from f1 and f2, so that the variation in the voltage conversion ratio V2/V1 can be reduced.

When the resistance values of the load R that show the characteristic curves (3) and (4) in FIG. 7(A) are set as the rated load, the slopes of the characteristic curves showing the voltage conversion ratio V2/V1 with respect to the frequency do not become sharp, and the circuit stabilizes. A tracking control circuit that searches the frequency at which the voltage conversion ratio V2/V1 becomes maximum when the resistance value of the load R is brought close to 10Ω from the high resistance value can be also relatively easily formed.

As described above, when the drive frequency fd is set to a value between two resonance frequencies generated by a complex resonance of the first resonance circuit RC1 and the second resonance circuit RC2, the variations in the voltage conversion ratio V2/V1 becomes small compared to the frequency variations, and thus, the ratio V2/V1 of the voltage V2 of the power receiving apparatus to the voltage V1 of the power transmitting apparatus in the case where the load varies can be stabilized.

In particular, when the drive frequency fd is set to the frequency of the marker m17 in FIG. 7(A) (the frequency at which the voltage conversion ratio V2/V1 is at its peak at the rated load), the voltage conversion ratio V2/V1 can be further stabilized even if the load varies.

As described above, in the case where the drive frequency of the high-frequency high-voltage generating circuit 11 of the power transmitting apparatus is determined such that the voltage conversion ratio V2/V1 becomes constant, the high-frequency high-voltage generating circuit 11 may be controlled such that the voltage V1 of the power transmitting apparatus becomes constant. In other words, the voltage V2 of the power receiving apparatus can be made constant by detecting the voltage V1 of the power transmitting apparatus and performing feedback control without directly monitoring the voltage V2 of the power receiving apparatus.

Note that since the drive frequency needs to be made constant, the generated voltage cannot be controlled by frequency control. Therefore, the control circuit 52 illustrated in FIG. 5(A) may control the duty of the switching circuit 56 via the drive control circuit 55. Alternatively, the control circuit 52 may control a voltage generated by the drive power supply circuit 51.

When the positional relationship between the coupling electrode of the power transmitting apparatus and the coupling electrode of the power receiving apparatus is changed, the degree of coupling of the coupling electrodes varies correspondingly. In the case where the degree of coupling varies as described above, the voltage conversion ratio V2/V1 varies, and thus, the voltage generated by the high-frequency high-voltage generating circuit 11 may be varied in accordance with the degree of coupling. The degree of coupling can be estimated from communications between the power transmitting apparatus and the power receiving apparatus and from measurement of the resonance frequency.

Note that when the power receiving apparatus includes a voltage detecting part, and information that is obtained by the voltage detecting part is caused to be fed back to the power transmitting apparatus, the voltage V2 of the power receiving apparatus can be further stabilized.

According to the first embodiment, even if a piezoelectric transformer that has sharp frequency characteristics is used, the influence of characteristic variations with respect to the frequency variations can be effectively reduced. In the case of using the piezoelectric transformer as the first resonance circuit, a configuration in which energy is not unnecessarily stored in the piezoelectric transformer can be realized, and the piezoelectric transformer can be prevented from overheating. Therefore, energy can be effectively transmitted to the load.

Second Embodiment

Figure 8:
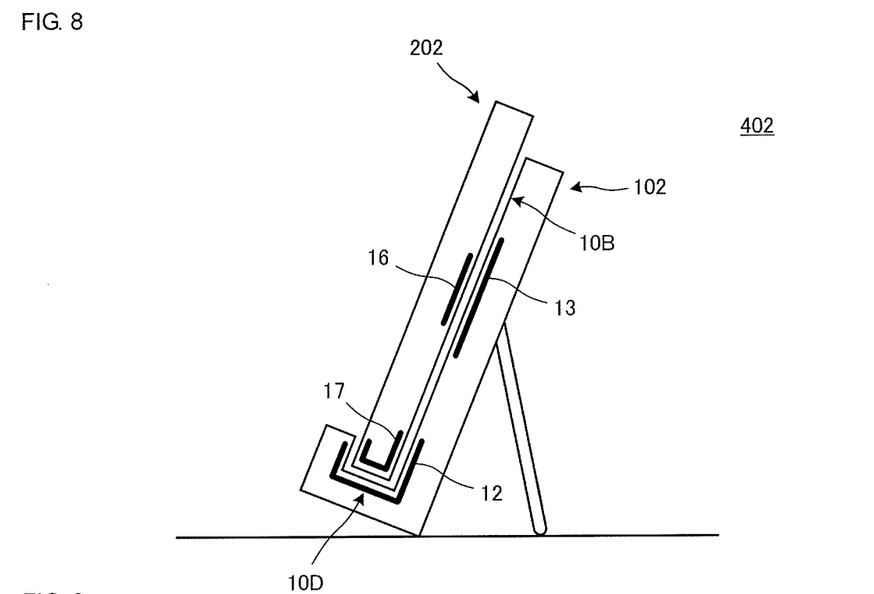
FIG. 8 is a schematic diagram of a power transmission system according to a second embodiment.

FIG. 8 is a schematic diagram of a power transmission system 402 according to a second embodiment. FIG. 8 particularly illustrates cross sections of a power transmitting apparatus 102 and a power receiving apparatus 202 that is mounted on the power transmitting apparatus 102. The power transmitting apparatus 102 includes a base 10D and a backrest 10B that is perpendicular to the base 10D. In a housing of the power transmitting apparatus 102, a passive electrode 12 of the power transmitting apparatus is provided along the base 10D. An active electrode 13 of the power transmitting apparatus is provided in the backrest 10B. In a housing of the power receiving apparatus 202, a passive electrode 17 of the power receiving apparatus is provided in a lower portion of the casing. An active electrode 16 of the power receiving apparatus is provided in the vicinity of the back surface of the power receiving apparatus 202.

Power is transmitted from the power transmitting apparatus 102 to the power receiving apparatus 202 while the power receiving apparatus 202 is mounted on the power transmitting apparatus 102 as described above.

Figure 9:
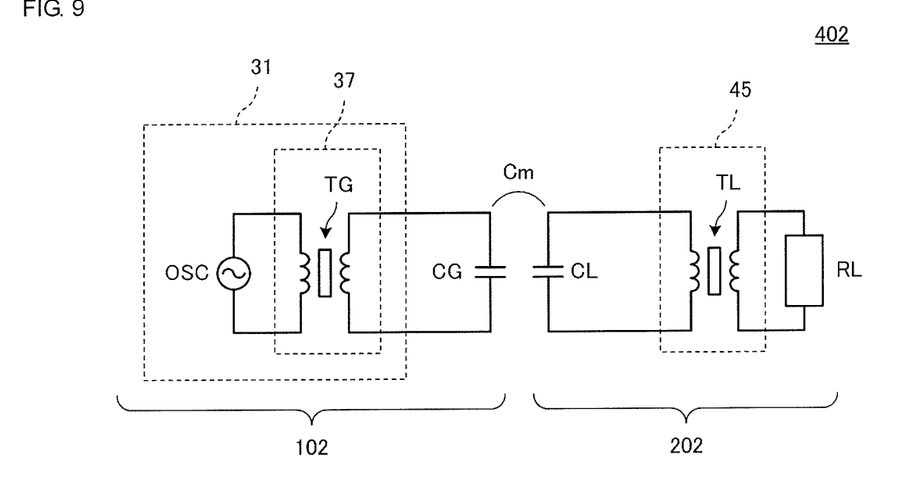
FIG. 9 is an equivalent circuit diagram of the power transmission system 402 according to the second embodiment.

FIG. 9 is an equivalent circuit diagram of the power transmission system 402 according to the second embodiment. In FIG. 9, a high-frequency voltage generating circuit OSC of the power transmitting apparatus 102 generates a high-frequency voltage having a predetermined drive frequency. A voltage step-up circuit 37 that includes a voltage step-up transformer TG steps up a voltage generated by the high-frequency voltage generating circuit OSC and applies the voltage between the passive electrode 12 and the active electrode 13 (see FIG. 8). A capacitance element CG mainly includes the capacitance generated between the passive electrode 12 and the active electrode 13.

A voltage step-down transformer 45 that includes a voltage step-down transformer TL is connected between the passive electrode 17 and the active electrode 16 of the power receiving apparatus 202 (see FIG. 8). A capacitance element CL mainly includes the capacitance generated between the passive electrode 17 and the active electrode 16. A load circuit RL is connected to the secondary side of the voltage step-down transformer TL. The load circuit RL includes a rectifying-and-smoothing circuit that includes a diode and a capacitor and a secondary battery. A coupling electrode of the power transmitting apparatus 102 and a coupling electrode of the power receiving apparatus 202 are coupled to each other via a mutual capacitance Cm as illustrated in FIG. 9.

Figure 10:
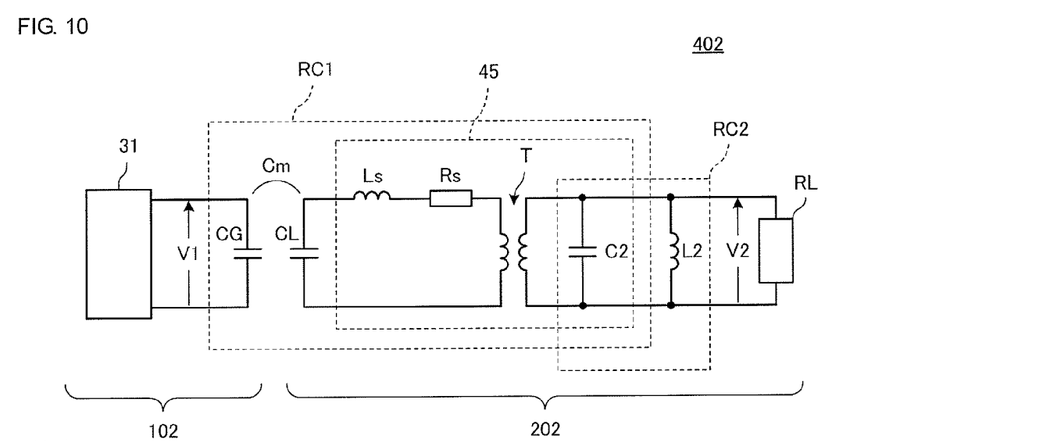
FIG. 10 is an equivalent circuit diagram of the power transmission system 402 according to the second embodiment.

FIG. 10 is an equivalent circuit diagram of the power transmission system 402 according to the second embodiment. As illustrated in FIG. 10, the voltage step-down transformer 45 includes a capacitance element C2, an inductance element Ls, a resistance Rs, and an ideal transformer T.

The inductance element Ls is an inductance component of a transformer, the capacitance element C2 is a stray capacitance, and the resistance Rs is a resistance component of a winding. A first resonance circuit RC1 includes the voltage step-down transformer 45, the capacitance of the capacitance element CL of the coupling electrode of the power receiving apparatus 202, and the capacitance of the capacitance element CG of the coupling electrode of the power transmitting apparatus 102. The resonance frequency of the first resonance circuit RC1 is determined by a circuit constant of the first resonance circuit RC1.

On the other hand, a second resonance circuit RC2 includes the capacitance element C2 that is a stray capacitance and the inductance element L2. The resonance frequency of the second resonance circuit RC2 is determined by the capacitance of the capacitance element C2 and the inductance of the inductance element L2.

The frequency of a high-frequency high voltage generated by a high-frequency high-voltage generating circuit 31 is set to a value between two resonance frequencies generated by a complex resonance of the first resonance circuit RC1 and the second resonance circuit RC2.

Figure 11:
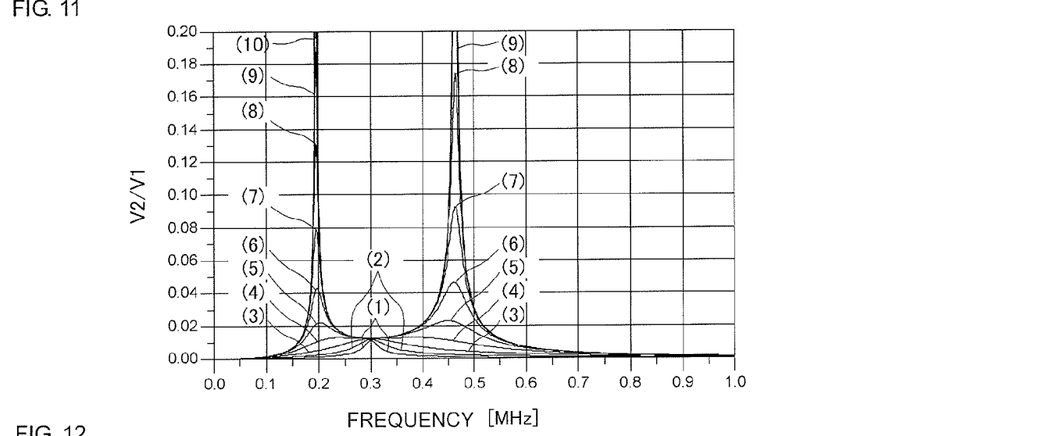
FIG. 11 illustrates the frequency dependence of the ratio (the voltage conversion ratio) of a voltage V2 that is applied to a coupling electrode of a power receiving apparatus 202 to a voltage V1 that is applied to a coupling electrode of a power transmitting apparatus 102 of the power transmission system according to the second embodiment.

FIG. 11 illustrates the frequency dependence of the ratio (the voltage conversion ratio) of a voltage V2 that is applied to a coupling electrode of the power receiving apparatus 202 to a voltage V1 that is applied to the coupling electrode of the power transmitting apparatus 102 of the power transmission system according to the second embodiment. In FIG. 11, the load is varied while the degree of coupling of the coupling electrode that includes the passive electrode and the active electrode of the power transmitting apparatus 102 and the coupling electrode that includes the passive electrode and the active electrode of the power receiving apparatus 202 is constant.

In FIG. 11, characteristic curves (1) to (10) represent frequency dependence characteristics at respective resistance values in the case where the resistance value of the load RL is varied in the range of 10Ω to 10 kΩ. As the number in parentheses becomes larger, the load resistance value becomes larger.

According to the second embodiment of the present invention, the frequencies at which the voltage conversion ratio V2/V1 becomes excessively large are 0.2 MHz and 0.45 MHz, and both the frequencies are significantly separated from a drive frequency (about 0.3 MHz). Therefore, the voltage conversion ratio V2/V1 is maintained substantially constant even if the drive frequency varies in accordance with load variations or the like.

As described above, also in a power transmission system that includes a power receiving apparatus using a wire-wound transformer, in the case where the drive frequency of the high-frequency high-voltage generating circuit 31 of the power transmitting apparatus is determined such that the voltage conversion ratio V2/V1 becomes constant, the high-frequency high-voltage generating circuit 31 may be controlled such that the voltage V1 of the power transmitting apparatus becomes constant. As a result, the voltage V2 of the power receiving apparatus can be made constant.

Third Embodiment

Figure 12:
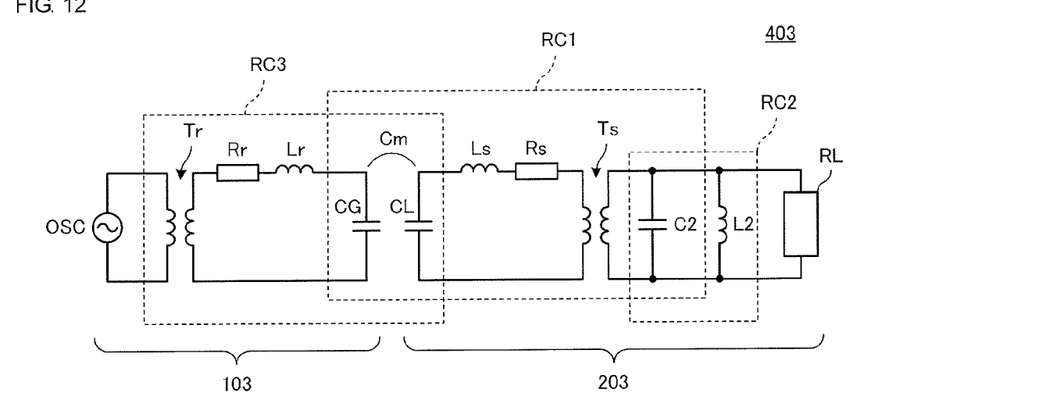
FIG. 12 is an equivalent circuit diagram of a power transmission system 403 according to a third embodiment.

FIG. 12 is an equivalent circuit diagram of a power transmission system 403 according to a third embodiment. The power transmission system 403 includes a power transmitting apparatus 103 and a power receiving apparatus 203. The configuration of the power receiving apparatus 203 is the same as that of the power receiving apparatus 202 of the second embodiment. The power transmitting apparatus 103 includes a voltage step-up transformer. The voltage step-up transformer includes an ideal transformer Tr, a resistance Rr, and an inductance element Lr as illustrated in FIG. 12. A third resonance circuit RC3 includes the ideal transformer Tr, the resistance Rr, the inductance element Lr, and capacitance elements CG and CL generated at coupling electrodes of the power transmitting apparatus 103 and the power receiving apparatus 203. The resonance frequency of the third resonance circuit RC3 is determined by the inductance element Lr and the capacitances of the capacitance elements CG and CL generated at the coupling electrodes.

In the third resonance circuit RC3, the resonance frequency is set in such a manner as to resonate at the frequency of a high-frequency voltage generated by a high-frequency voltage generating circuit OSC.

According to the third embodiment, the third resonance circuit RC3 resonates with the high-frequency high voltage that is applied to the power-transmitting-apparatus coupling electrode, so that the voltage step-up ratio can be increased. In addition, since the third resonance circuit RC3 resonates with the high-frequency high voltage, occurrence of harmonics can be suppressed. Since a reactance component can be cancelled, impedance matching can be performed, and thus, the efficiency of transferring power from the power transmitting apparatus to the power receiving apparatus can be enhanced.

REFERENCE SIGNS LIST

C1, C2 capacitance element
CG, CL capacitance element
Cm mutual capacitance
Cp capacitance element
E11 output terminal
E12 reference potential terminal
E20 input terminal
L2 inductance element
Lp inductance element
Lr inductance element Ls inductance element
OSC high-frequency voltage generating circuit
RC1 first resonance circuit
RC2 second resonance circuit
RC3 third resonance circuit
RL load circuit
Rp, Rr, Rs resistance
TG voltage step-up transformer
TL voltage step-down transformer
T, Tp, Tr ideal transformer
V detection signal
V1 voltage of power transmitting apparatus
V2 voltage of power receiving apparatus
11 high-frequency high-voltage generating circuit
12 passive electrode of power transmitting apparatus
13 active electrode of power transmitting apparatus
15 power receiving circuit
16 active electrode of power receiving apparatus
17 passive electrode of power receiving apparatus
31 high-frequency high-voltage generating circuit
32 piezoelectric transformer
37 voltage step-up circuit
45 voltage step-down transformer
51 drive power supply circuit
52 control circuit
55 drive control circuit
56 switching circuit
58 ACV detection circuit
101-103 power transmitting apparatus
201-203 power receiving apparatus
401-403 power transmission system

The invention claimed is:

1. A power transmission system comprising:
a power transmitting apparatus including:
   a power-transmitting coupling electrode having an active electrode and a passive electrode, and
   a voltage generating circuit configured to apply a high-frequency high voltage to the power-transmitting coupling electrode; and
a power receiving apparatus including:
   a power-receiving coupling electrode having an active electrode and a passive electrode, and
   a power receiving circuit coupled to the power-receiving coupling electrode, the power receiving circuit comprising an inductance element and a load circuit connected in parallel to the inductance element,
wherein, when the power transmitting apparatus is positioned in proximity to the power receiving apparatus to create an electric field coupling relationship between the respective coupling electrodes, a first resonance circuit that includes a transformer inductance element and a first transformer capacitance element is formed in series between the active electrode and the passive electrode of the power-receiving coupling electrode, and a second resonance circuit is formed that includes a second transformer capacitance element and the inductance element of the power receiving circuit that is connected in parallel to the second transformer capacitance element, and
wherein the voltage generating circuit is configured to set a frequency of the high-frequency high voltage to a value between two resonance frequencies generated by a complex resonance of the first resonance circuit and the second resonance circuit.

2. The power transmission system according to claim 1, wherein the voltage generating circuit comprises:
   a voltage detection circuit configured to generate a detection voltage based on the high-frequency high voltage applied to the power-transmitting coupling electrode; and
   a control circuit configured to control the high-frequency high voltage generated by the voltage generating circuit such that the detection voltage becomes constant.

3. The power transmission system according to claim 2, wherein the voltage generating circuit further comprises:
   a voltage step-up circuit coupled to the active electrode of the power-transmitting coupling electrode;
   a drive power supply circuit configured to supply a direct-current voltage;
   a switching circuit coupled to the drive power supply circuit configured to drive an input of the voltage step-up circuit; and
   a drive control circuit configured to switch a switching element of the switching circuit in response to a control signal received from the control circuit.

4. The power transmission system according to claim 3, wherein the switching circuit is configured to perform a push-pull operation by turning on and off the switching element to alternately drive the voltage step-up circuit.

5. The power transmission system according to claim 2, wherein the voltage detection circuit divides and rectifies the high-frequency high voltage to generate the detection voltage.

6. The power transmission system according to claim 1, wherein the power receiving circuit includes a piezoelectric transformer having:
   an input terminal coupled to the active electrode of the power-receiving coupling electrode,
   an output terminal coupled to the passive electrode of the power-receiving coupling electrode, and
   a reference potential terminal,
   wherein the piezoelectric transformer is configured to step down a voltage applied to the input terminal and to output the stepped-down voltage to the output terminal.

7. The power transmission system according to claim 6, wherein the second transformer capacitance element is an equivalent output capacitance of the piezoelectric transformer.

8. The power transmission system according to claim 6, wherein the inductance element is an impedance matching circuit between the load circuit and the piezoelectric transformer.

9. The power transmission system according to claim 1, wherein the first resonance circuit further includes capacitance components that are generated at the power-transmitting coupling electrode and the power-receiving coupling electrode.

10. The power transmission system according to claim 1, wherein the voltage generating circuit includes a third resonance circuit that resonates with the high-frequency high voltage applied to the power-transmitting coupling electrode.

11. A power receiving apparatus attachable to a power transmitting apparatus including a power-transmitting coupling electrode having an active electrode and a passive electrode, and a voltage generating circuit that applies a high-frequency high voltage to the power-transmitting coupling electrode, the power receiving apparatus comprising:
   a power-receiving coupling electrode configured to be coupled to the power-transmitting coupling electrode, the power-receiving coupling electrode including an active electrode and a passive electrode; and a power receiving circuit connected to the power-receiving coupling electrode, the power receiving circuit including an inductance element and a load circuit connected in parallel to the inductance element, wherein, when the power receiving apparatus is positioned in proximity to the power transmitting apparatus to create an electric field coupling relationship between the respective coupling electrodes, a first resonance circuit that includes a transformer inductance element and a transformer capacitance element, and a second resonance circuit is formed that includes the transformer capacitance element and the inductance element connected in parallel to the transformer capacitance element, and wherein the voltage generating circuit is configured to set a frequency of the high-frequency high voltage to a value between two resonance frequencies generated by a complex resonance of the first resonance circuit and the second resonance circuit.

12. The power receiving apparatus according to claim 11, wherein the power receiving circuit includes a piezoelectric transformer.

13. The power receiving apparatus according to claim 12, wherein the transformer capacitance element of the power receiving circuit is an equivalent output capacitance of the piezoelectric transformer.

14. The power receiving apparatus according to claim 12, wherein the piezoelectric transformer comprises:
an input terminal coupled to the active electrode of the power-receiving coupling electrode,
an output terminal coupled to the passive electrode of the power-receiving coupling electrode, and
a reference potential terminal.

15. The power receiving apparatus according to claim 14, wherein the piezoelectric transformer is configured to step down a voltage applied to the input terminal and to output the stepped-down voltage to the output terminal.

16. The power receiving apparatus according to claim 15, wherein the transformer capacitance element of the power receiving circuit is an equivalent output capacitance of the piezoelectric transformer.

17. The power receiving apparatus according to claim 12, wherein the inductance element is an impedance matching circuit between the load circuit and the piezoelectric transformer.

18. The power receiving apparatus according to claim 11, wherein the first resonance circuit further includes capacitance components that are generated at the power-transmitting coupling electrode and the power-receiving coupling electrode.

19. A power transmission system comprising:
a power transmitting apparatus including:
a power-transmitting coupling electrode having an active electrode and a passive electrode, and
a voltage generating circuit configured to apply a high-frequency high voltage to the power-transmitting coupling electrode; and
a power receiving apparatus including:
a power-receiving coupling electrode having an active electrode and a passive electrode, and
a power receiving circuit connected to the power-receiving coupling electrode, the power receiving circuit comprising an inductance element and a load circuit connected in parallel to the inductance element,
wherein, when the power transmitting apparatus is positioned in proximity to the power receiving apparatus to create an electric field coupling relationship between the respective coupling electrodes, a first resonance circuit is formed that includes a transformer inductance element and a transformer capacitance element, and a second resonance circuit is formed that includes the transformer capacitance element and the inductance element of the power receiving circuit that is connected in parallel to the transformer capacitance component, and
wherein the voltage generating circuit is configured to set a frequency of the high-frequency high voltage to a value between two resonance frequencies generated by a complex resonance of the first resonance circuit and the second resonance circuit.

20. The power receiving apparatus according to claim 11, wherein the first resonance circuit further includes an additional transformer capacitance element connected in series with the transformer inductance element.

* * * * *